United States Patent [19]

Akiyama

[11] Patent Number: 4,882,625

[45] Date of Patent: Nov. 21, 1989

[54] IMPROVED DEFINITION TELEVISION SET WITH EXTERNAL LUMINANCE AND CHROMINANCE SIGNAL INPUTS

[75] Inventor: Toru Akiyama, Tokorozawa, Japan

[73] Assignee: Pioneer Electronic Corporation, Tokyo, Japan

[21] Appl. No.: 271,580

[22] Filed: Nov. 15, 1988

[30] Foreign Application Priority Data

Feb. 19, 1988 [JP] Japan .................................. 63-37044

[51] Int. Cl.⁴ .............................................. H04N 3/32
[52] U.S. Cl. ..................................... 358/140; 358/137
[58] Field of Search ............... 358/133, 135, 137, 140, 358/11, 21 R, 288, 105

[56] References Cited

U.S. PATENT DOCUMENTS 3,715,483  2/1973  Limb ..................................... 358/135
4,057,835  11/1977  Kinuhata .............................. 358/140

OTHER PUBLICATIONS

Improved Television System: NTSC and Beyond, by W. Schreiber, SMPTE Journal, Aug. 1987, pp. 734–744.

Primary Examiner—Tommy P. Chin
Attorney, Agent, or Firm—Foley & Lardner, Schwartz, Jeffery, Schwaab, Mack, Blumenthal & Evans

[57] ABSTRACT

An improved definition television (IDTV) set including a motion sensing circuit for sensing motion of images and generating a motion sensing signal, a motion adaptive Y/C separating circuit separating a composite video signal into a luminance signal and a chrominance signal on the basis of the motion sensing signal, chroma demodulation and matrix circuit generating three primary color signals of red, green, and blue from separate luminance and chrominance signals separated at the Y/C separating circuit, and a motion adaptive scanning line converting circuit for converting a line scanning method of the three primary color signals to a progressive line scanning, while effecting a field or line interpolation operation to the three primary color signals. The television set is characterized by a first selector for alternatively supplying external luminance and chrominance signals supplied from the outside or the separate luminance and chrominance signals to the chroma demodulation and matrix circuit, and a second selector for alternatively supplying, the external luminance signal or a summing signal of said external luminance and chrominance signals, or the composite video signal to the motion sensing circuit.

3 Claims, 4 Drawing Sheets

IMPROVED DEFINITION TELEVISION SET WITH EXTERNAL LUMINANCE AND CHROMINANCE SIGNAL INPUTS

BACKGROUND OF THE INVENTION

1. Field of the Invention

The present invention relates to an IDTV (Improved Definition television) set.

2. Description of Background Information

IDTV represents a television set adapted for receiving a video signal of the present television broadcast standard, and improving the quality of picture only on the set's side by a signal processing operation using a field memory or a frame memory. Such IDTV sets are now being introduced in the market.

An example of the structure of the IDTV set is shown in FIG. 1. As shown in this figure, a composite video signal inputted through a video input terminal 1 is supplied to a motion adaptive Y/C separation circuit 2 and to a motion sensing circuit 3. The motion adaptive Y/C separation circuit 2 is, for example, configured to perform an inter-line Y/C separation operation, and an inter-frame Y/C separation operation, and to determine the ratio between the inter-line Y/C separation and the inter-frame Y/C separation in accordance with a detection output signal of the motion sensing circuit 3. More specifically, the inter-frame Y/C separation operation becomes dominant in the motion adapted Y/C separation circuit 2 when the pictures being treated is close to a still picture, and the inter-line Y/C separation operation becomes dominant when the picture being treated contains a lot of motions. By this feature, the Y/C separation operation without generating the cross color and the cross luminance disturbances can be attained for still pictures, and also the Y/C separation operation without generating the so called blur can be attained for motion pictures (pictures having motion).

The luminance signal and color signals separated in the motion adaptive Y/C separation circuit 2 are supplied to a chroma demodulation and matrix circuit 4, in which three primary color signals of R(red), G(greeen), B(blue) are generated by a matrix composition of signals obtained after a chroma demodulation operation. These three primary colors are supplied to a motion adaptive scanning line converting circuit 5. In the motion adaptive scanning line coverting circuit 5, the RGB signals having 525/2 lines/field and which is an interlace signal having the ratio of 2:1 are converted to R'G'B' signals having a double line density of 525 lines/field, and the R'G'B' signals are in turn supplied to a CRT 6. The motion adaptive scanning line converting circuit 5 is controlled by the detection output signal of the motion sensing circuit 3. In short, an interpolating operation is performed when the number of the scanning lines is converted from (525/2) lines/field to 525 lines/field. Moreover, the field interpolating operation is performed for still pictures containing no motion, and the line interpolating operation is performed within the present frame in the case of motion pictures. By this feature, non-interlaced scanning is performed, so that the line flickering is eliminated, the vertical resolution is improved, and the blur of motion is eliminated.

As described above, by inputting a composite color video signal to an IDTV set, it becomes possible to enjoy images which are not suffering from the cross color and cross luminance disturbances and the line flickering, while having an improved vertical resolution. Moreover, pictures without the time-wise blur can be obtained.

However, conventional IDTV sets are constructed to receive a composite video signal, so that it was not possible to directly use luminance and chrominance signals outputted from a device having separate terminals for Y and C signals, such as VTRs (video tape recorders), or VCRs. For this reason, there has been a restriction that the input signal must be in the form of a composite video signal. Thus, it was not possible to make the most of once completely separated luminance and chrominance signals.

OBJECT AND SUMMARY OF THE INVENTION

An object of the present invention is therefore to provide an IDTV set which is adaptive to luminance and chrominance signals outputted from an external apparatus having separate Y/C terminals such as VTR or a VCR.

An IDTV set according to the present invention is configured to alternatively supply external luminance and chrominance signals or luminance and chrominance signals separated at a Y/C separating circuit to a chroma demodulation and matrix circuit depending on whether or not the external luminance and chrominance signals supplied from the outside are selected, and to alternatively supply one of a composite video signal and the external luminance signal or a summing signal between the external luminance and chrominance signals, to a motion sensing circuit.

DETAILED DESCRIPTION OF PREFERRED EMBODIMENTS

The embodiments of the present invention will be specifically described with reference to the accompanying drawings.

Figure 1:
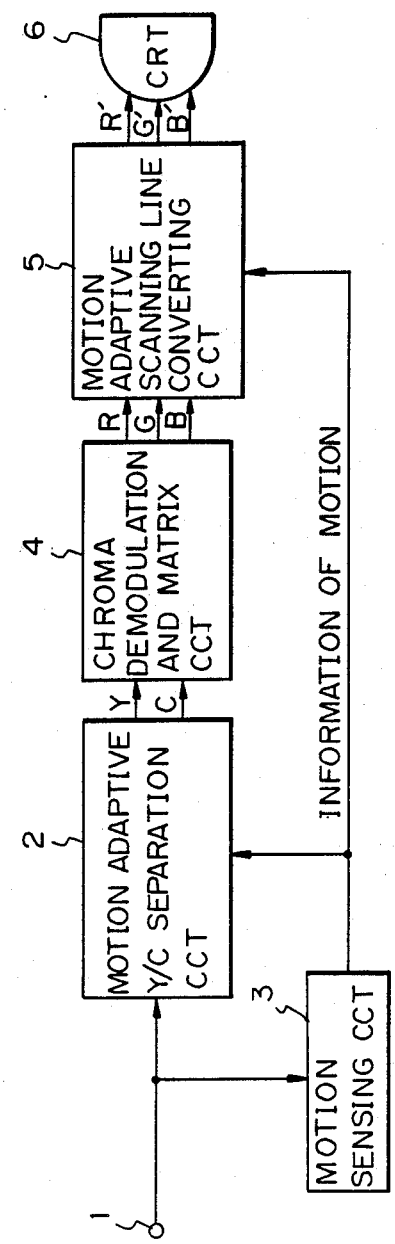
FIG. 1 is a block diagram showing the construction of a conventional IDTV set.
Figure 2:
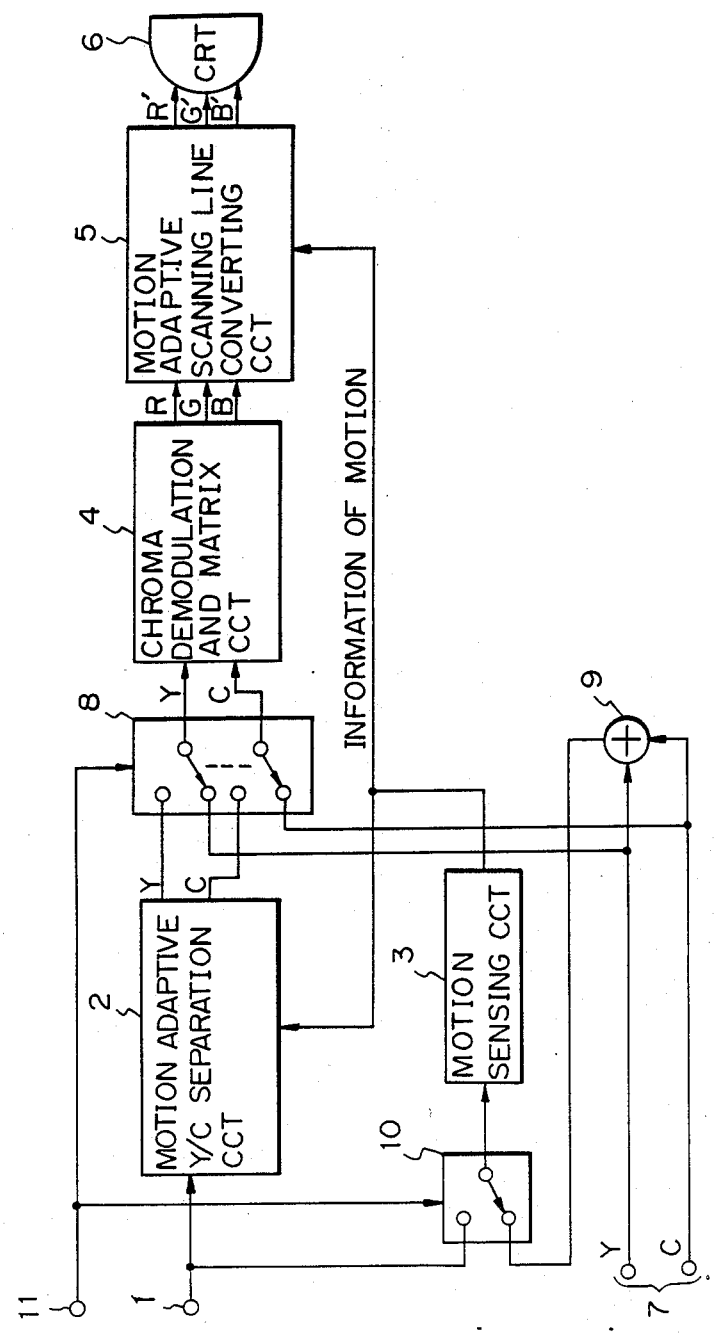
FIG. 2 is a block diagram showing the construction of an embodiment of the IDTV set according to the present invention.

FIG. 2 shows the first embodiment of the present invention in which same reference numerals denote circuit elements corresponding to the elements illustrated in FIG. 1.

As shown in FIG. 2, the illustrated TV set is provided with input terminals 7 for separate Y/C signals (referred to as separate Y/C signal input terminals hereinafter). Externally generated luminance and chrominance signals such as signals outputted from a video tape recorder having separate Y/C signal terminals (not shown) are supplied to the separate Y/C signals input terminals 7. These external luminance and chrominance signals are in the form of separate Y/C signals on account that the recording format of the video tape recorder (of home use) is the separated Y/C system. The external luminance and chrominance signals inputted through the separate Y/C signals input terminals 7 are supplied to input terminals of a switch 8 which functions as a first selecting means, and also supplied to an adder 8 in which the signals are added together. A summing signal from the adder 8 is supplied to an input terminal of a switch 10 operating as a second selecting means. The switch 8 receives, at other input terminals thereof, the luminance and chrominance signals separated at the motion adaptive Y/C separation circuit 2. With this arrangement, the switch 8 supplies selected ones of the luminance and chrominance signals to the chroma demodulation and matrix circuit 4. On the other hand, the switch 10 receives, at the other input terminal thereof, the composite video signal inputted through the video input terminal 1, and supplied either one of the summing signal and the composite video signal to the motion sensing circuit 3. Switching operations of these switches 8 and 10 are controlled by a switching signal which is supplied from outside of the television set through a control input terminal 11.

With this arrangement, when the switch signal has a high level, movable contacts of the switches 8 and 10 are positioned to select the signals supplied at the upper input terminals in FIG. 2. In this state, the signal path and the operation of the set are exactly the same as those of the set shown in FIG. 1.

Conversely, the switching signal is turned to a low level if the signals from the separate Y/C signals input terminals 7 are to be selected. In this state, the switch 8 selects the signals supplied at the lower ones of the input terminals shown in FIG. 2. As a result, the external luminance and chrominance signals supplied from the separate Y/C signals input terminals 7 are supplied to the chroma demodulation and matrix circuit 4 wherein the chroma demodulation and matrix operations are performed to generate the RGB signals. The RGB signals obtained at the chroma demodulation and matrix circuit 4 are supplied to the motion adaptive scanning line converting circuit 5 wherein the RGB signals are converted to non-interlace signals and supplied to the CRT 6. Under this condition, the switch 10 is also operated to select the signal at the lower one of the input terminals, so that the summing signal of the external luminance signal and the external chrominance signal is supplied from the adder 9 to the motion sensing circuit 3. In the motion sensing circuit, motion of the picture is sensed on the basis of the summing signal of the external luminance signal and the external chrominance signal. For this reason, the operation of the motion adaptive scanning line converting circuit 5 is performed completely.

Figure 3:
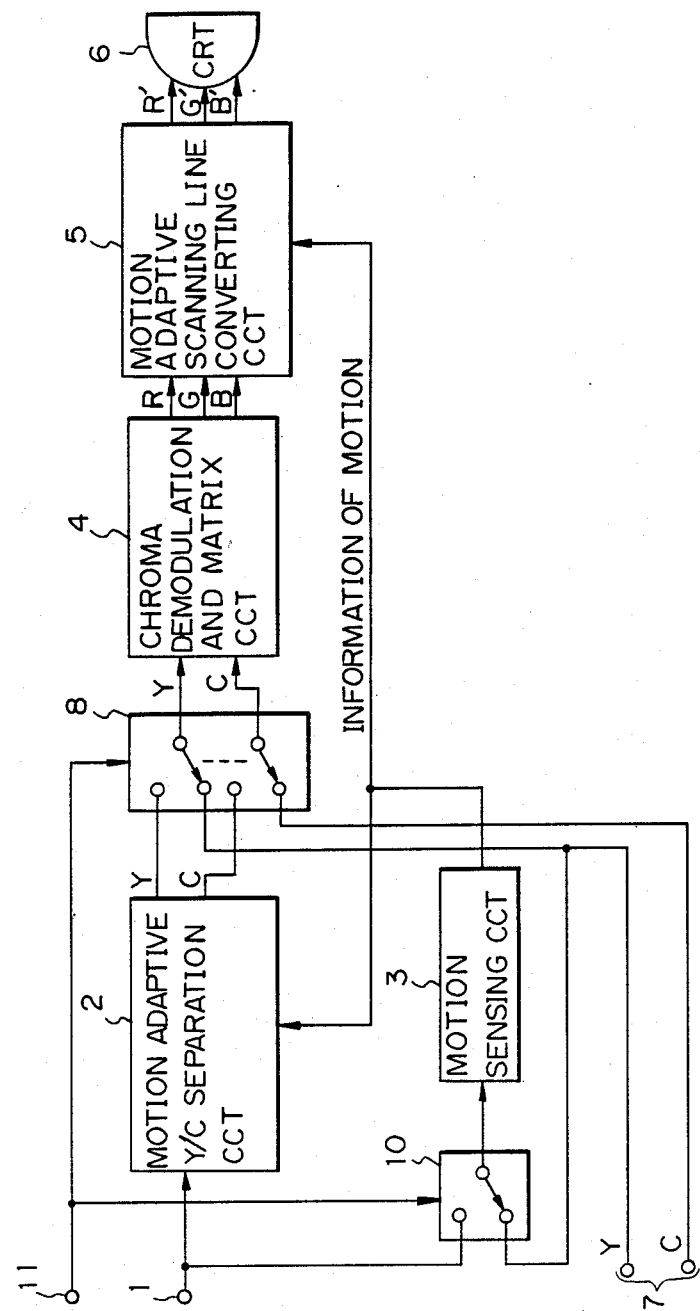
FIG. 3 is a block diagram showing the construction of another embodiment of the IDTV set according to the present invention.

In the embodiment described above, the summation signal of the external luminance signal and the external chrominance signal is used as the input signal of the motion sensing circuit when the signals inputted through the separate Y/C signals input terminals 7 are selected. However, since information of the movement can be sensed sufficiently only from the luminance signal, it is also possible to arrange the set such that only the external luminance signal is used as an input signal of the motion sensing circuit 3 as illustrated in FIG. 3. If the external luminance signal only is used as the input signal of the motion sensing circuit, the following advantageous effects can be attained.

1. One of the problems in sensing motion of the picture is the error due to noises. If noises are contained in a signal representing a still picture including entirely no motion, the noises will be erroneously sensed as components representing the motion since such noises generally have no field or frame correlation. Therefore, a still picture can be judged to include a motion. On the other hand, noises are contained both in the luminance signal and the chrominance signal, while the detection of motion can be sufficiently performed by using the luminance signal only. Accordingly, there is an advantage that the chance of erroneous sensing of motion can be reduced by using the luminance signal only, rather than to use, for sensing the motion, the chromatic signal having noises in combination with the luminance signal.

2. In the case of a VTR (or a VCR) having separate Y/C signal output terminals, the luminance signal is generally suffering from the skew error and jitter. However, the subcarrier signal of the chrominance signal is outputted as a signal free of jitter in phase. More specifically, it can be regarded that the luminance signal and the subcarrier signal of the chrominance signal has different jitters. In order to sense the motion in these signals, it is general to sense, as the motion signal, the difference component between fields or frames by using a field/frame memory operating at clocks following the jitter of the luminance signal. However, as described above, the subcarrier signal of the chrominance signal does not have the same phase as the luminance signal having jitter. Therefore, even for a still picture, the correlation signal between fields or frames which is sensed by using clocks generated from the luminance signal will not have the correlated characteristic. For this reason, it is obvious that using the external luminance signal only is more advantageous than to use the summing signal between the external luminance signal and the external chrominance signal.

3. Also for the standard NTSC signal, one cycle of the color subcarrier signal is contained in four fields in respect of the color frame. Therefore, it is necessary to sense the correlation over four fields (two frames) for detecting the motion. However, if only the luminance signal is used, it is only necessary to sense the correlation over two fields (one frame). Therefore, the memory capacity of the memory can be reduced to half, to enable the cost down.

Figure 4:
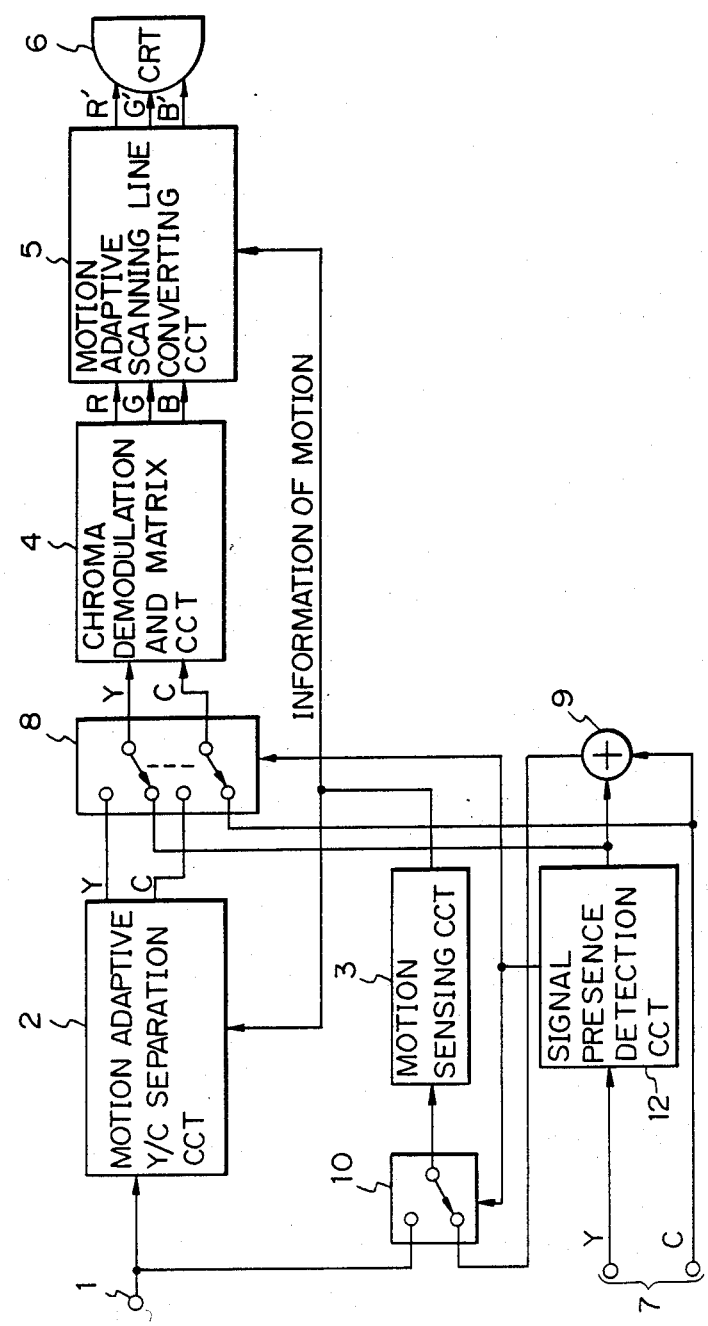
FIG. 4 is a block diagram showing the construction of a further embodiment of the IDTV set according to the present invention.

In the above described embodiment, the switching operations of the switches 8 and 10 are controlled in accordance with the switch control signal supplied from outside. However, the arrangement is not limited to this, and the switch control signal can be generated in the set. For instance, as illustrated in FIG. 4, it is possible to arrange the circuit such that a signal presence detection circuit 12 is inserted in one of signal lines connected to the separate Y/C signals input terminals 7, e.g., in the signal line of the external luminance signal, and the switches 8 and 10 are operated to primarily select the input signals supplied through the separate Y/C signals input terminals 7.

As explained above, the IDTV set according to the present invention is configured such that the external luminance and chrominance signals are directly supplied to the circuit part after the chroma demodulation circuit when the input signals from the separate Y/C signals input terminals are selected, and the signal supplied to the separate Y/C signals input terminals is used as an input signal of the motion detection circuit. Therefore, the set is adapted to luminance and chrominance signals outputted from an external apparatus having separate Y/C signals output terminals, such as a VTR. Moreover, the motion sensing operation is performed also for the signal supplied from the separate Y/C signals input terminals, so that the motion adaptive scanning line converting operation is performed perfectly, and pictures of high quality can be obtained.

In addition, the present invention is quite useful for systems in which a single motion sensing circuit is used to control both Y/C separation and scanning line converting operations.

What is claimed is:

1. In an improved definition television (IDTV) set including, a motion sensing means for sensing motion of images and generating a motion sensing signal, a motion adaptive Y/C separating circuit separating a composite video signal into a luminance (Y) signal and a chrominance (C) signal on the basis of said motion sensing signal, a chroma demodulation and matrix circuit generating three primary color signals of red (R), green (G), and blue (B) from separate luminance and chrominance signals separated at said Y/C separating circuit, and a motion adaptive scanning line converting circuit for converting a line scanning method of said three primary color signals to a progressive line scanning, while effecting a field interpolation operation or a line interpolation operation to said three primary color signals on the basis of said motion sensing signal, wherein the improvement comprises: a first selecting means for alternatively supplying external luminance and chrominance signals or said separate luminance and chrominance signals to said chroma demodulation and matrix circuit; and a second selecting means for alternatively supplying at least said external luminance signal or said composite video signal to said motion sensing means.

2. An improved definition television set as set forth in claim 1, wherein a summation signal to said external luminance and chrominance signals is supplied to said second selecting means and said second selecting means is operative to supply said summing signal or said composite video signal alternatively to said motion sensing means.

3. An improved definition television set as set forth in claim 1, further comprising means for generating a switch control signal for controlling said first and second selecting means in response to at least one of said external luminance and chrominance signals.

* * * * *